(12) United States Patent
Mandal (10) Patent No.: US 7,290,045 B2
(45) Date of Patent: Oct. 30, 2007

(54) METHOD AND APPARATUS FOR MANAGING A STORAGE AREA NETWORK INCLUDING A SELF-CONTAINED STORAGE SYSTEM

(75) Inventor: Chhandomay Mandal, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 733 days.

(21) Appl. No.: 10/186,550

(22) Filed: Jul. 1, 2002

(65) Prior Publication Data

US 2004/0024854 A1 Feb. 5, 2004

(51) Int. Cl.
*G06F 15/173* (2006.01)

(52) U.S. Cl. .................... 709/223; 709/209; 709/211; 709/212; 709/214

(58) Field of Classification Search ............... 709/202, 709/203, 223, 209, 211, 212, 214
See application file for complete search history.

(56) References Cited

U.S. PATENT DOCUMENTS

| | | | | |
|---|---|---|---|---|
| 4,298,932 A * | 11/1981 | Sams | ........................ | 711/202 |
| 4,961,139 A | 10/1990 | Hong et al. | | |
| 5,150,308 A | 9/1992 | Hooper et al. | | |
| 5,452,447 A | 9/1995 | Nelson et al. | | |
| 6,253,295 B1 | 6/2001 | Beal et al. | | |
| 6,393,481 B1 * | 5/2002 | Deo et al. | ................... | 709/224 |
| 6,425,005 B1 * | 7/2002 | Dugan et al. | ................ | 709/223 |
| 6,584,499 B1 * | 6/2003 | Jantz et al. | .................. | 709/220 |
| 6,643,671 B2 | 11/2003 | Mililllo et al. | | |
| 6,643,748 B1 * | 11/2003 | Wieland | ..................... | 711/152 |
| 6,651,117 B1 * | 11/2003 | Wilson et al. | ................. | 710/33 |
| 6,769,001 B2 | 7/2004 | Halstead et al. | | |
| 6,769,124 B1 | 7/2004 | Schoening et al. | | |
| 6,775,700 B2 | 8/2004 | Cheng et al. | | |
| 6,954,786 B1 * | 10/2005 | Vered et al. | ................ | 709/223 |
| 6,957,251 B2 * | 10/2005 | Wisner et al. | .............. | 709/220 |
| 6,971,090 B1 * | 11/2005 | Gruttadauria et al. | ........ | 717/136 |
| 2003/0105852 A1 * | 6/2003 | Das et al. | .................... | 709/223 |

* cited by examiner

*Primary Examiner*—Michael Won
(74) *Attorney, Agent, or Firm*—Dorsey & Whitney LLP (57) ABSTRACT

A storage area network (SAN) system that includes a self-contained storage system is managed by a three-tier management system. Management of the self-contained storage system and data services for that system is provided by a three-tiered dedicated management system mirroring the management system that manages the SAN system. In both the SAN management system and the dedicated management system the lowest, or agent, tier comprises Common Information Model (CIM) provider objects that can configure and control the internal components, including the internal switch fabric and disks of both systems. The middle, or logic, tier of the dedicated management system is a set of management facades and federated Java beans. In order to integrate the dedicated management system with the SAN management system, the beans comprising the middle tier of the dedicated management system are also deployed in a shared Jiro™ station associated with the SAN management system.

26 Claims, 9 Drawing Sheets

METHOD AND APPARATUS FOR MANAGING A STORAGE AREA NETWORK INCLUDING A SELF-CONTAINED STORAGE SYSTEM

FIELD OF THE INVENTION

This invention relates to management of storage area network data storage systems and, in particular, to distributed and integrated management of storage area networks that include self-contained storage controllers.

BACKGROUND OF THE INVENTION

High performance computer systems typically require large amounts of storage. Many such systems use storage that is dedicated to each server in the system. However, this results in isolated islands of storage that are not efficient or flexible. In order to increase the efficiency of such systems, various distributed storage systems have been developed.

Figure 1:
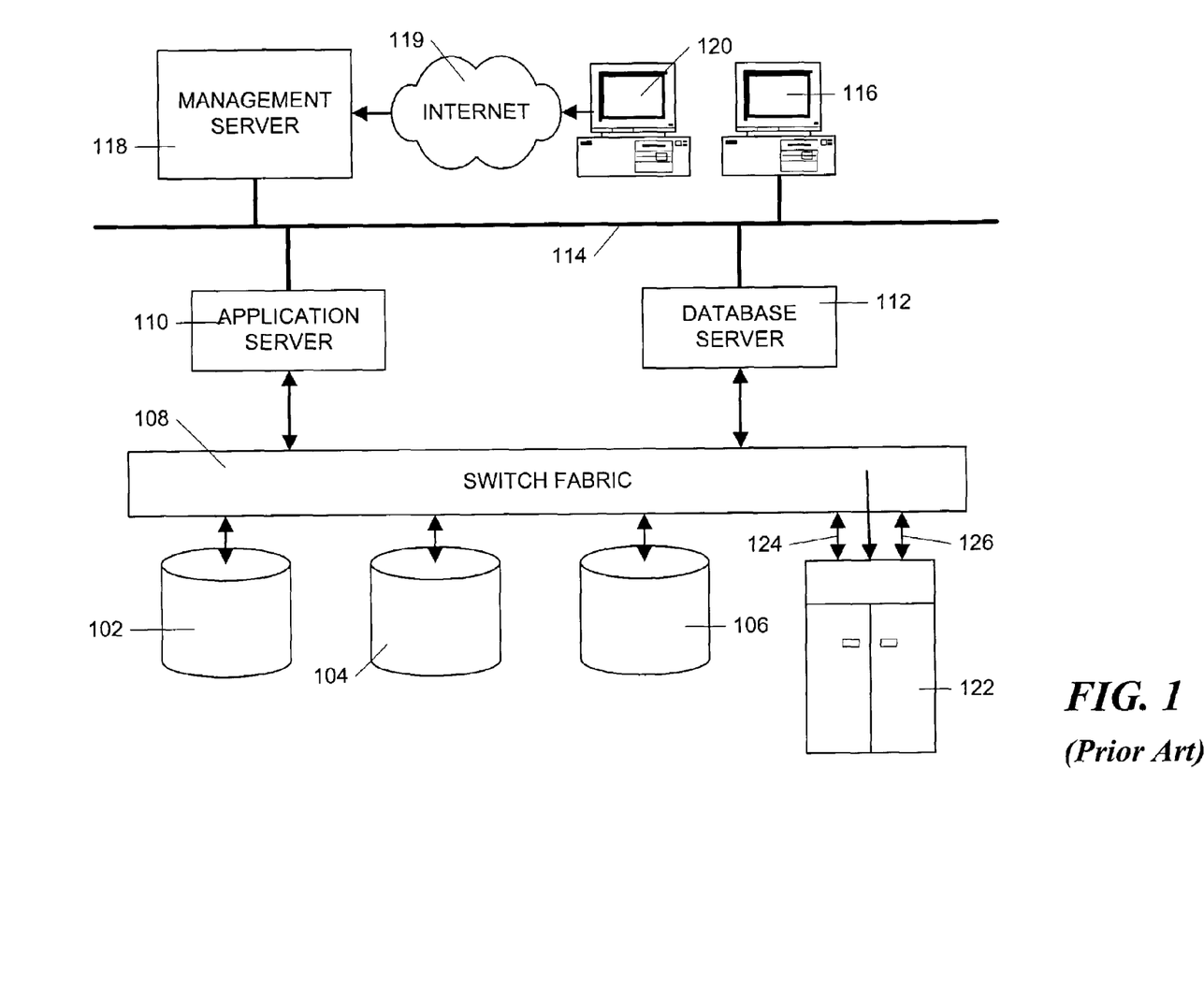
FIG. 1 is a block schematic diagram illustrating a conventional SAN system including a self-contained storage system.

One common distributed storage system is called a storage area network (SAN) that uses an array of disks connected by a Fibre optic switch fabric to storage servers. The storage servers are connected to a network that delivers the storage services to the high performance computer systems. A typical SAN system is shown in FIG. 1. In this system, an array of Fibre optic disks, represented schematically by disks 102-106 are connected, via Fibre optic switch fabric 108 to storage servers 110 and 112, that might illustratively be an application server 110 and a database server 122. Although only two servers are shown for clarity, one or more servers can be used in such a system. Servers 110 and 112 are, in turn, connected by a conventional network 114 to one or more SAN clients, of which client 116 is illustrated in FIG. 1.

It is common in many computer systems to provide administrative personnel with data services that allow data storage to be controlled and backup copies of stored data to be made where necessary. These data services can include data volume management in which one or more logical "volumes" are created from stored data so that the data in each volume can be manipulated as a unit.

Data backup services may include data replication in which a second copy or "mirror" of information located at a primary site is maintained at a secondary site. When changes are made to the primary data, updates are also made to the secondary data so that the primary data and the secondary data remain "synchronized."

Another data backup service that can be provided is data imaging in which a data copy often called a data "snapshot" or "image" can be made of stored data at a designated point in time. This service provides a system administrator with the ability to make and to maintain the aforementioned replicated data storage systems.

Still other data services can be provided. For example, data stored and retrieved in a data storage system may be transferred through a fast cache memory in a process called "data caching" in order to improve overall data storage performance. Often it is desirable for system administrators to be able to control whether data caching is used with a particular data storage or a data volume residing on that storage in order to effectively use a limited resource.

These services are provided and managed by means of distributed data management software that is discussed in detail below. For example, the data management software can run in a dedicated management server 118 that is connected to network 114. Alternatively, the data management software can run in one of the other servers connected to the network. This data management software can be accessed and controlled by administrative personnel via one or more administrative terminals, of which terminal 120 is shown. Terminal 120 can be connected directly to network 114 or, as shown in FIG. 1, the terminal 120 can be located elsewhere and access the management server 118 by another mechanism such as the Internet 119.

In order to increase further the efficiency of such a SAN system, self-contained storage systems, such as system 122 can also be connected to the switch fabric 108. Storage system 122 itself contains an array of disks that can be connected by an internal Fibre optic switch fabric to one or more Fibre optic ports 124,126 that connect the system to switch 108. An internal storage controller controls the internal switch fabric to efficiently connect the disks in the internal disk array to the ports 124, 126. The system 122 is completely self-contained, including both power and cooling subsystems. Such a system is marketed as a StorEdge T model 9970/9980 storage system by Sun Microsystems, Inc., 901 San Antonio Avenue, Palo Alto, Calif.

The inclusion of a self-contained storage system 122 in the conventional SAN system 100 presents some problems with regard to providing and managing the aforementioned data services for the disks internal to the system 122. One problem is that the disks internal to storage system 122 are not directly visible to the management software in server 118 so that it is difficult to integrate them into the distributed data system managed by the software in server 118. Another problem is that some mechanism must be introduced into the self-contained storage system into order to provide the appropriate data services and this mechanism must be amenable to distributed control by the software in server 118.

SUMMARY OF THE INVENTION

In accordance with the principles of the present invention, the SAN system is managed by a three-tier management system and management of the self-contained storage system and data services for that system is provided by a three-tiered dedicated management system mirroring the management system that manages the SAN system. In order to provide data services, a data service stack is inserted between the self-contained storage system and the SAN system. The lowest, or agent, tier of the dedicated system comprises Common Information Model (CIM) provider objects that can control the data service stack to provide the data services and can also control the internal components, including the internal switch fabric and disks.

The middle, or logic, tier of the dedicated management system is a set of management facades and federated Java beans. The federated Java beans include a general configuration bean for data services and configuration and health monitor service beans for each individual data service. These beans are deployed in a private Jiro™ station associated with the self-contained storage controller. In accordance with another embodiment of the invention, in order to integrate the dedicated management system with the SAN management system, the beans comprising the middle tier of the dedicated management system are also deployed in a shared Jiro™ station associated with the SAN management system.

In yet another embodiment, the upper, or presentation, tier of the inventive dedicated management system comprises web-based presentation programs that provide a first view of the services provided by the federated beans for policy-based management and a second view of the data management facades for element-based management. The provision of separate presentation programs for the dedicated management system allows administration personnel to obtain an overall view of the SAN system including the self-contained storage controller and to also obtain a detailed view of the self-contained storage controller, if necessary.

In another embodiment, each CIM provider instance operates in a CIM object manager (CIMOM) running in the self-contained storage controller and is represented by a management facade that is created and deleted by a management facade factory when the CIM provider instance is created and deleted.

In still another embodiment, each data service in the dedicated storage controller is managed by a separate Jiro-based federated bean running in the storage controller. The beans export interfaces containing methods that can be called by the presentation programs so that management personnel can access and control the data services in the self-contained storage system.

In yet another embodiment, the presentation programs in the dedicated management system are web-based graphic user interfaces (GUIs) that use a lookup service to obtain a proxy to selected federated beans. The GUIs then use that proxy to make methods calls on the beans to manage the data services controlled by the beans.

BRIEF DESCRIPTION OF THE DRAWINGS

The above and further advantages of the invention may be better understood by referring to the following description in conjunction with the accompanying drawings in which.

DETAILED DESCRIPTION

Figure 2:
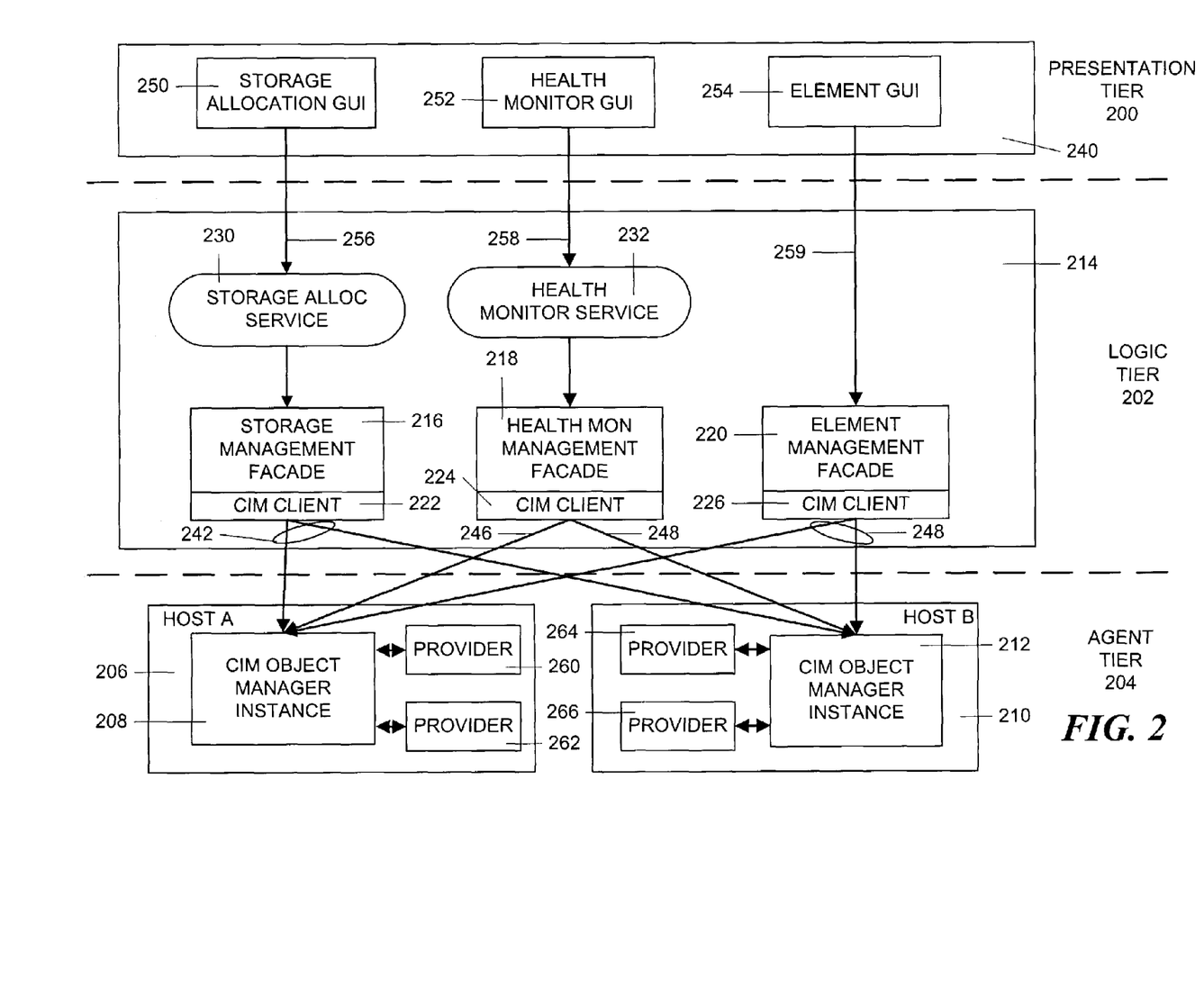
FIG. 2 is a block schematic diagram of a three-tiered management system that can be used to manage both the elements of the SAN system and data services provided by the SAN system.

A distributed data services management system suitable for use with the present invention comprises three layers or tiers 200, 202 and 204, The presentation tier 200 comprises software that generates a collection of GUIs 250, 252 and 254, which can be displayed in a management terminal 240 that might illustratively comprise the terminal 120 as shown in FIG. 1. The presentation tier 200, in turn, interacts with a middle, or logic, tier 202 comprised of a plurality of data services, represented by services 230 and 232, each of which performs specific tasks in the data services system. The logic tier 202 may illustratively be provided by software running in a host 214, which might correspond to management server 118 (FIG. 1), or elsewhere in the system. GUIs 250 and 252 are connected to respective data services 230 and 234, either by a network or the Internet as illustrated schematically by arrows 256 and 258. Some of the services can communicate with management facades 216 and 218 that are also located in the logic tier 202. Management facades 216 and 218 represent, and communicate with, CIM providers 260-266 located in the lowest, or agent, tier 204. The CIM providers 260-266 control software in the hosts 206 and 210 that actually perform the data services. Hosts 206 and 210 correspond to the servers 110 and 112 shown in FIG. 1. Although only four CIM providers are illustrated in FIG. 2, a CIM provider would generally be provided for each data service and physical element in the SAN system. GUI 254 allows an administrator to view, configure and control the various elements in the SAN system, including the disks 102-106, switch fabric 108 and servers 110 and 112. GUI 254 communicates, as indicated schematically by arrow 259, with an element management facade 220 that, in turn, controls the system elements, via providers 260-266. In this manner, an entire SAN system can be configured and managed from one or more administrative locations.

CIM providers 260-266 are constructed in accordance with the Common Information Model, or CIM. CIM is an object-oriented information model for describing managed resources such as disks, CPUs, and operating systems. This model is a proposed industry standard that is promulgated by the Distributed Management Task Force, Inc. and is described in detail in the Common Information Model Specification, version 2.2, Jun. 14, 1999. This document is available at http://www.dmtf.org and is incorporated by reference in its entirety.

CIM describes overall management information in a network enterprise environment and is comprised of a Specification and a Schema. The Specification defines the details for integration with other management models, while the Schema provides the actual model descriptions In the CIM model, managed resources, such as printers, disk drives, or CPUs are represented by CIM objects. CIM objects can be shared by any WBEM-enabled system, device, or application. CIM objects with similar properties and purposes are represented as CIM classes. Properties are attributes that describe a unit of data for a class. An instance is a representation of a managed object that belongs to a particular class. Instances contain actual data. For example, Solaris_ComputerSystem is a CIM class that represents a computer that runs the Solaris™ operating environment. Solaris is a trademark of Sun Microsystems, Inc. The Solaris software that runs on a SUN workstation is an instance of the Solaris_OperatingSystem class. ResetCapability and InstallDate are examples of properties of the Solaris_ComputerSystem class. CIM providers are classes that communicate with managed objects to access data.

Each schema comprises a meaningful collection of CIM classes with a single owner (an organization). Schemas are used for administration and class naming and each CIM class can belong to only one schema. All class names must be unique within a particular schema. The schema name is the determining factor in differentiating classes and properties from others that may have the same name.

The Common Information Model categorizes information from general to specific and each CIM schema is divided into three layers of information. These include a core layer that comprises a subset of CIM not specific to any platform and a common layer that comprises information which visually depicts concepts, functionality, and representations of entities related to specific areas of network management, such as systems, devices, and applications. The third layer is an extension layer that comprises information models that support the CIM Schema and represent a very specific platform, protocol, or corporate brand.

CIM providers 260-266 are each, in turn, managed by a CIM Object Manager (CIMOM) (208 and 212, respectively) that stores the CIM objects internally as Java classes. When a client application accesses information about a CIM object, the associated CIM Object Manager contacts either an appropriate CIM provider for that object or a CIM Object Manager repository that contains data regarding the objects.

More specifically, when a client application requests data from a managed resource and the data is not available from the CIM Object Manager repository, the CIM Object Manager forwards the request to the provider for that managed resource using object provider APIs to communicate with providers. The provider then contacts the resource and dynamically retrieves the information. For example, in response to a request from the CIM Object Manager to retrieve information regarding a device, a provider gets native information from a device, maps the native information format to CIM classes, and passes the information to the CIM Object Manager in the form of the CIM classes. In response to a request to send information to a device, a provider maps the information from CIM classes to native device format, gets the required information from the CIM class and passes the information to the device in native device format.

CIM data in CIM objects can be accessed by a CIM client in accordance with a protocol called Web Based Enterprise Management (WBEM). WBEM is an industry-wide initiative that includes standards for web-based management of systems, networks, and devices on multiple platforms. This standardization enables system administrators to manage desktops, devices, and networks. WBEM is designed to be compatible with all major existing management protocols, including Simple Network Management Protocol (SNMP), Distributed Management Interface (DMI), and Common Management Information Protocol (CMIP). WBEM encompasses the CIM model, a managed object format (MOF) language for defining CIM classes and instances and an extensible Markup Language (XML), a generalized markup language that can be used to describe managed resources on the web. Details concerning the WBEM protocol can be found on the World Wide Web at http://www.sun.com/solaris/wbem.

In FIG. 2, three CIM clients 222, 224 and 226 can access CIM object managers 208 and 212, respectively over a connection on the network connecting the computer on which the logic tier 202 resides with the host computers 206 and 210. These network connections are indicated schematically by arrows 242 and 244, respectively. A WBEM client application, such as client application 222, contacts a CIM Object Manager, such as manager 208, to establish a connection, shown schematically by arrow 242, when the client needs to perform WBEM operations, such as creating a CIM class or updating a CIM instance. When WBEM client application 222 connects to the CIM object manager 208, the WBEM client 222 gets a reference to the CIM Object Manager 208, which the client then uses to request services and operations.

The clients 222, 224 and 226 are located in the logic tier 202, which may, for example, be part of a management server 214 located in any computer in the distributed system. The logic tier 202 is implemented with a plurality of Federated Java™ (trademark of Sun Microsystems, Inc.) beans and management facades. The federated beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html (JSR#9).

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. The framework provides dynamic services beans of the middle tier. Dynamic services require a hosting entity called a "station", which is a mechanism to allow many services to run within a single Java Virtual Machine. Every management domain contains one or more general-purpose shared stations. These stations may be private or shared. For example, the federated beans and management facades of the logic tier 202 can be deployed in a shared Jiro™ station.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at http://www.jiro.com, which manual is incorporated by reference in its entirety.

For storage allocation purposes, the main federated bean is the storage allocation service bean 230. Bean 230 is a Federated Bean as described in the aforementioned Federated Management Architecture (FMA) specification. When created, it registers itself with the shared Jiro™ station, and provides its services to other federated beans within the same Jiro™ management domain.

Bean 230 interacts with a data service management facade 216 that, in turn, connects to the CIM client 222. The management facade 216 provides a means by which the CIM client 222 can be accessed and managed as a Jiro™ service, i.e., a service that can be managed in a distributed environment from a remote host. The management facade 216 is essentially an object-oriented model of the CIM client 222 and provides a collection of APIs to manage the CIM client 222.

In addition to functional beans that provide control and configuration services for the storage allocation service, a CIM client, such as client 224, also interacts with CIM object managers, such as managers 208 and 212 (as indicated schematically by arrows 246 and 248) to provide "health monitoring" services. Health monitoring services can further be categorized into three specific types: administrative services, error handling services and status checking services. An example of an administrative service would be setting and changing health monitoring polling time intervals. This is necessary because different services need different polling cycles, as polling is intrusive in some cases. Another example is turning on and off a specific health monitoring service. In particular, if there is no need to run health monitoring for a service, the administrator should be able to turn the health monitoring service off to save system resource usage.

Error handling services include taking corrective measures proactively when an error is detected. Status reporting services include reporting various data service states back to an administrator. For health monitoring purposes, the main federated bean is the health monitoring bean 232.

The presentation tier 200 is comprised of web-based GUIs 250, 252 and 254 that would generally be provided via a conventional web browser. When one of the GUIs 250, 252 and 254 is invoked via the web browser, it uses the aforementioned Jiro™ lookup service to obtain a proxy to a corresponding federated bean. The GUI uses this proxy to make method calls on the federated bean to obtain the required information. Alternatively, the GUIs 250, 252 and 254 may use the services of a webserver in a remote management server to locate and control the federated beans 230, 232 and management facade 220.

Figure 3:
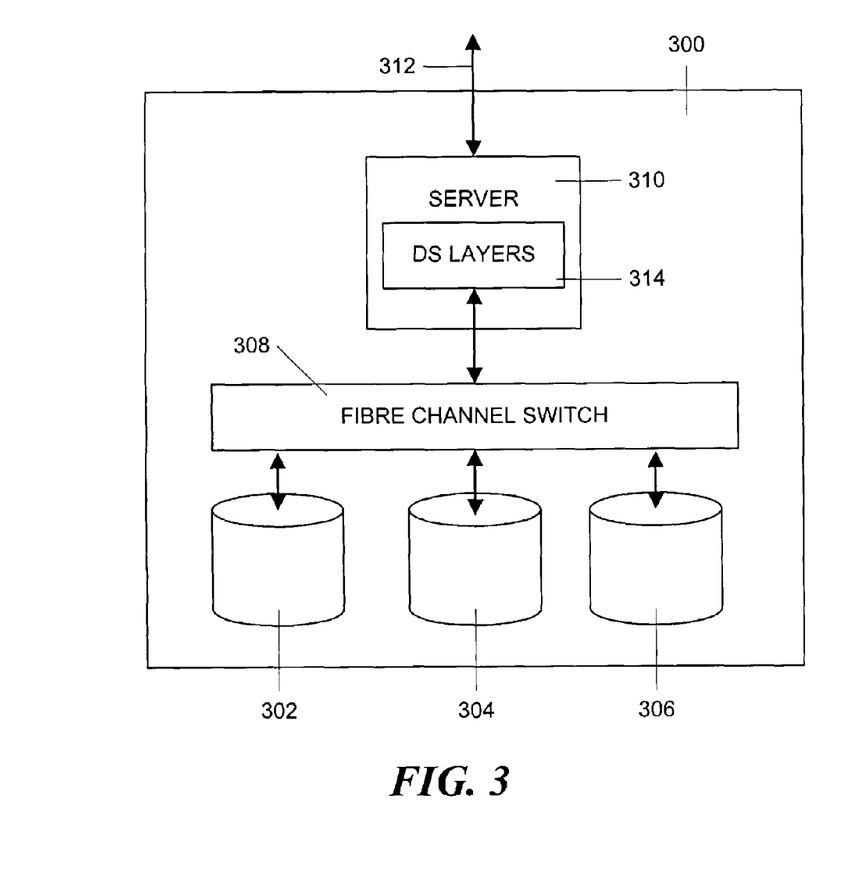
FIG. 3 is a block schematic diagram of a self-contained storage system showing the internal arrangement of disks, switch fabric and controller and a data service layer stack included to provide data services.

FIG. 3 illustrates in a schematic form, the internal architecture of a self-contained storage system 300, such as the aforementioned Sun StorEdge™ 9970/9980 systems. The storage system 300 comprises an array of disks connected by a Fibre optic switch fabric to one or more storage servers. The array of Fibre optic disks, represented schematically by disks 302-306 is connected, via Fibre optic switch fabric 308 to storage server 310. Although only one server is shown for clarity, two or more servers can be used in such a system. Server 310 is, in turn, connected by a Fibre optic cable connection 312 to the aforementioned SAN system. The storage system 300 would also typically contain power and cooling subsystems that are conventional and are not shown for clarity.

In order to provide data services such as network data replication, data imaging, data caching, etc. in system 300, a stack of data service players 314 is inserted in server 310 between the drivers for Fibre optic connection 312 and volume manager software that controls the logical allocation of the storage in disks 302-306. This stack is shown in more detail in FIG. 4.

Figure 4:
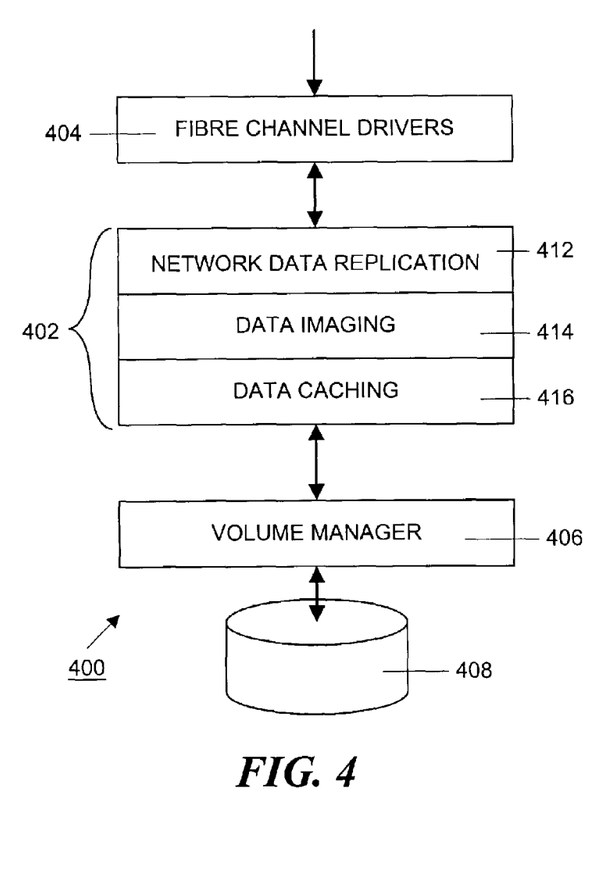
FIG. 4 is a block schematic diagram illustrating an illustrative layered stack of drivers that can be used to provide a variety of data services in a self-contained storage system.

As shown in FIG. 4, the stack 400 comprises a plurality of data service layers 402. The data manipulation processes, which actually perform the data services, are typically low-level routines written in a platform-dependent language that are part of an operating system kernel running on a server, such as server 310. A separate "layer" is provided for each data service. The kernel layers 402 are located between Fibre channel drivers 404 and the volume manager software 406 that manages logical volumes on the disks that are represented by disk 408. The data service kernel layers include a storage network data replicator (SNDR) kernel module 412 for providing data replication services that involve transparent replication of volumes over public or private Internet protocol infrastructure, or locally, via SCSI protocol, over Fibre channel connections.

The data imaging module 414 implements a "point-in-time" volume copy data service between volumes in a data image volume set. The data image volume set contains the original logical volume (the master volume), the point-in-time copy of the original (the shadow volume) and a volume used to store a bitmap that tracks the differences between the master and shadow volumes. Once the data image volume set is established, the master and shadow volumes can be accessed independently. The data-imaging module allows data updates to be sent from the master volume to the shadow volume as well as updates to be sent from the shadow volume to the master volume when desired.

The caching module 416 provides block based caching operations for disk input/output. These operations provide typical caching functionality, such as read caching, read ahead and small write coalescing for sequential writes. Module 116 also provides write caching when non-volatile RAM cards are installed as a safe store (called a "fast write cache"). The data service kernel layer architecture requires that any volume that will be used by a data service must already be under the control of the data service modules 402.

Figure 5:
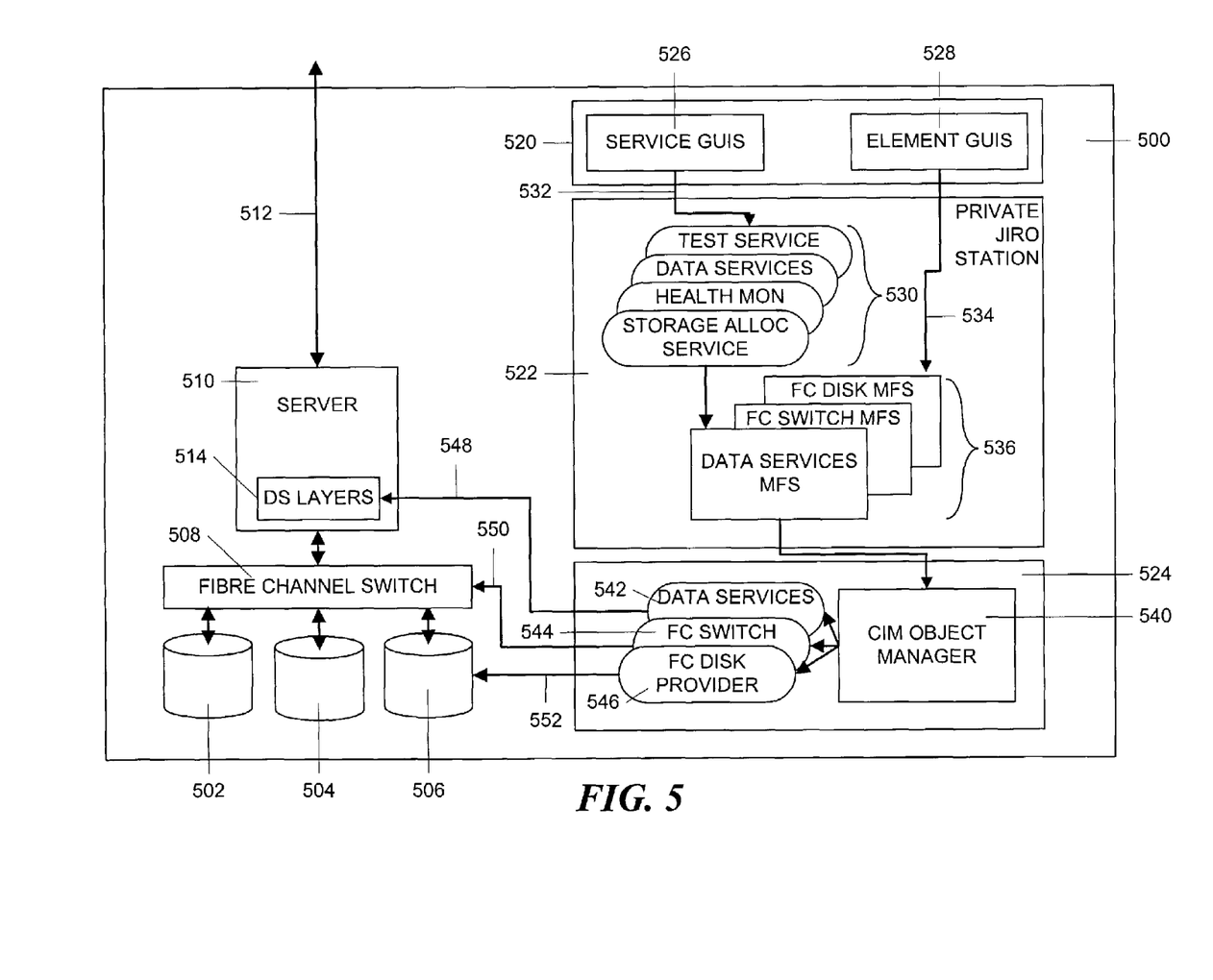
FIG. 5 is a block schematic diagram illustrating a three-tiered management system employed to manage the internal components and data services of a self-contained storage system.

FIG. 5 shows a self-contained storage system modified in accordance with the principles of the invention. In FIG. 5, some elements correspond to the elements shown in FIG. 3 and those elements have been given corresponding numeral designations. For example, disk 302 in FIG. 3 corresponds to disk 502 in FIG. 5. In FIG. 5, the self-contained storage system has been modified by adding a presentation tier represented by web server 520, a logic tier represented by a private Jiro™ station 522 and an agent tier represented by WBEM services 524. Although these three tiers are shown as separate elements in FIG. 5, all three of the tiers would comprise software running in server 510 or another computer system resident in the storage system.

Figure 6:
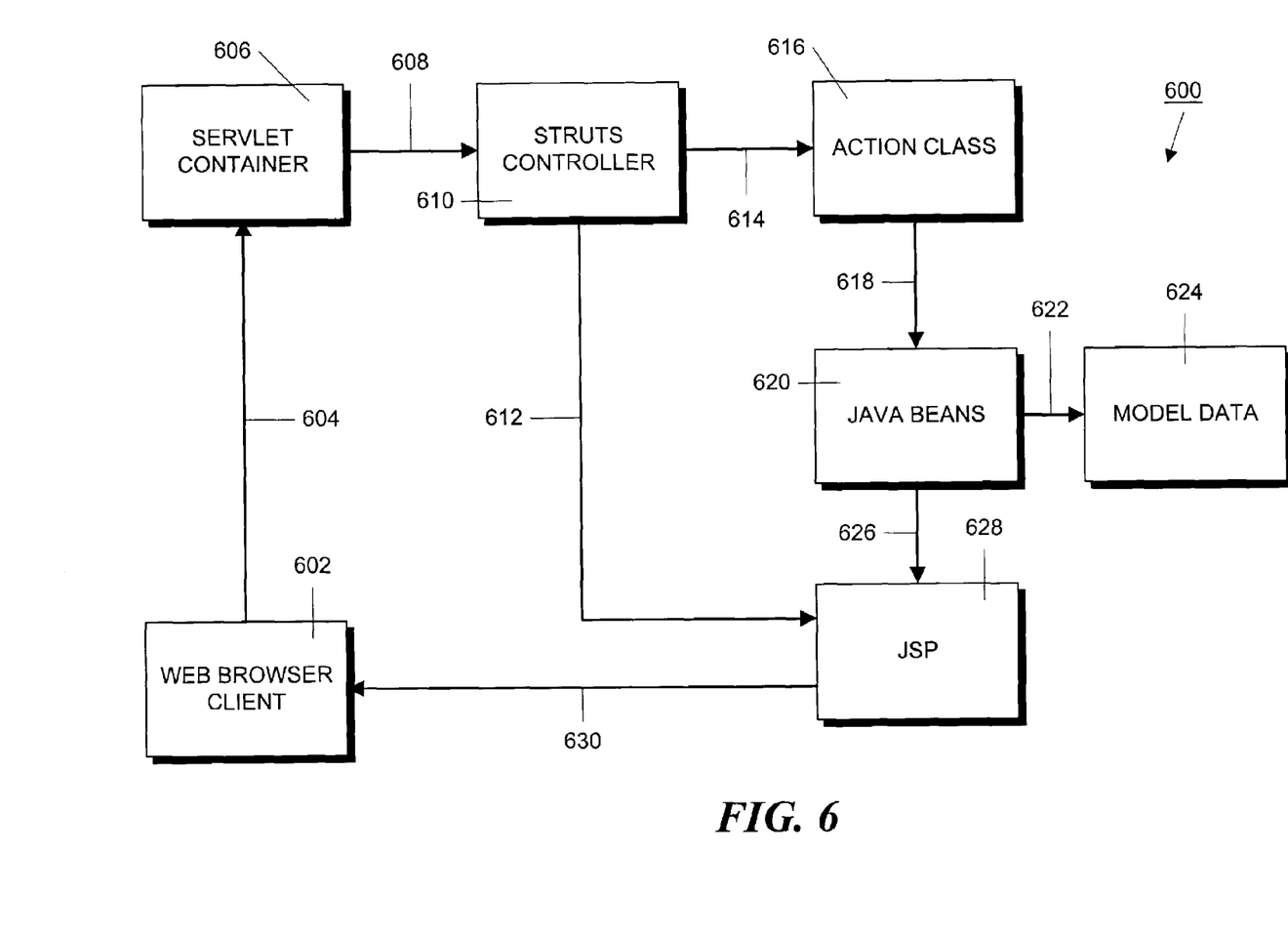
FIG. 6 is a block schematic diagram illustrating an illustrative implementation of a web server using STRUTS controller architecture.

The web server 520 generates GUIs including service GUIs 526 that allow an administrator to interact with various services. In general, a separate GUI would be provided for each service. Also provided in the web server 520 are element GUIs that allow an administrator to configure and control the various elements of the storage system including disks 502-506, switch fabric 508 and other elements, such as host bus adapters (HBAS) not shown in FIG. 5. The web server can be implemented as shown in FIG. 6.

GUI 526 interacts with various services 530 provided in a logic tier as indicated by arrow 532. The services 530 are implemented by federated Java beans as described above in connection with the SAN management system. A separate Java bean would generally be used to provide each service. These services might include storage allocation services for the storage contained in the self-contained system, health monitoring services, the aforementioned data services and test services.

The services 530, in turn, interact with the management facades 536 also in a manner as previously described in connection with the SAN management system. For example, the data services Java bean interacts with a data services management facade and the storage allocation service, health monitoring service and test service might interact with others of management facades 536.

As indicated schematically by arrow 534, the element GUIs interact directly with management facades associated with the various elements in the storage system including the Fibre channel switch management facade, the Fibre channel disk facade and others not shown such as an HBA management facade.

The management facades 536 each contain a CIM client that can contact the CIM object manager 540 in the agent tier via the WBEM protocol as previously mentioned. The agent tier also contains CIM providers for each element in the system. These CIM providers include a Fibre channel disk provider 546 that can configure and retrieve information from the disks 502-506 as indicated schematically by arrow 550. Similarly, a Fibre channel switch provider 544 that can configure and retrieve information from the switch 508 as indicated schematically by arrow 548. The data services provided by the data services layer stack 514 are configured and controlled by a data services CIM provider 542. Other CIM providers, such as an HBA CIM provider, not shown in FIG. 5, can also be provided.

In one embodiment, web-based GUIs used for the inventive storage management system are based on a framework called the "Struts" framework. The Struts framework is an open source framework useful in building web applications with Java Servlet and JavaServer Pages (JSP) technology. The framework is designed to encourage application architectures based on a Model-View-Controller (MVC) design paradigm. The framework includes, as primary areas of functionality, a controller servlet that dispatches requests to appropriate "Action" classes provided by an application developer, JSP custom tag libraries, and associated support in the controller servlet, that assists developers in creating interactive form-based applications and utility classes to support XML parsing, automatic population of JavaBeans properties based on the Java reflection APIs, and internationalization of prompts and messages.

The Struts framework is being developed as part of the Jakarta Project, sponsored by the Apache Software Foundation, 1901 Munsey Drive, Forest Hill, Md. 21050-2747. Complete details of the Struts framework can be found at http://jakarta.apache.org/struts.

FIG. 6 illustrates the overall architecture of the user interface framework 600 used in the illustrative embodiment and based on the Struts framework. The user interacts with a client interface that, in turn, uses the well-known Hypertext Transfer Protocol (HTTP) protocol to communicate with the rest of the system. In one embodiment, the client could be a web browser, such as web browser 602. In other embodiments, the client could be a corresponding command line interface (not shown in FIG. 6.)

For example, the client could be implemented as a form written in HTML which can be displayed in web browser 602 and accept input. Forms for controlling a data service might include, for example, a form directed to manipulating data imaging. This form could accept as input, a set name, two volume names, two bitmap volumes, and options for the set type. Similarly, an HTML form for manipulating data imaging groups could accept as input, a group name, multiple set names, and options to attach an overflow volume.

Information retrieved via the client 602 is sent, as indicated by arrow 604, to the servlet container 606 to be processed. The servlet container 606 would normally be container within a web server (not shown in FIG. 6.) Web server software suitable for use with the present invention is Tomcat web server software available from the aforementioned Apache Software Foundation.

Servlets are programs that run within the web server and process requests from an HTTP client. The servlet container that is bundled with the Tomcat web server supports all servlet activity. In this architecture, the servlet container provides the appropriate libraries to process requests. These libraries would generally include the appropriate Jiro™ Federated Beans, Management Facades, and related Jiro and CIM libraries. Once the necessary resources are confirmed, the servlet container passes control to the struts controller 610.

The Struts controller 610 bundles and routes HTTP requests to other objects in the framework. It is responsible for the flow of control and maps requests to the appropriate handlers. The controller 610 creates one instance of an Action class, such as class 616, and uses this instance for all requests. Specifically, for the data imaging system, if the Struts controller 610 can make a successful mapping to an appropriate handler, it will forward to a path name, such as "/Jiro" to the handler, otherwise it will record a failure and send the error results to the Java Server Pages 628 to be displayed as described below and as indicated schematically by arrow 612.

Action class 616 receives a request from the Struts controller 610 and interprets information in the request. Class 616 then instantiates an appropriate Java Bean with the given information as schematically illustrated by arrow 618. After locating the bean and completing some task, class 616 can also forward the request to another action class (not shown in FIG. 6.) The action 616 class parses and interprets information in a client request, including the information submitted by the client. Once the parsing is complete, the class 616 instantiates one of the aforementioned federated beans with the appropriate input and begins to call the bean methods as necessary. This latter action is indicated schematically by arrow 618.

Usually, the federated beans use a form of Java Remote Method Invocation (RMI) to retrieve their data. The model data 624 for this prototype lies in CIM providers objects and Jiro Management Facades. The model data 624 that the federated bean retrieves is sent to the Java Server Pages 628 to be displayed as indicated by arrow 626. In addition, the Java Server Pages 628 can send requests to the Java beans for particular information to display. In a data service system, the federated bean acts as a wrapper to the data model 624. The bean does a lookup of the data model components, that is the management facade or the CIM client, using the Jiro lookup service. Once a proxy to these remote objects is received, real time data from the model data 624 can be retrieved by calling methods on the bean.

A Java Server Page 628 is used to incorporate dynamic data into an HTML page. The JSP 628 gets its data from the Java Beans 620 and therefore separates the processing of data from the representation of the data. The JSP 620 then sends its information back to the client browser for display as indicated by arrow 630. In a data service system, the JSP 628 creates a reference to the existing instance of a federated bean and begins to call the methods on the bean. The information that the bean returns is formatted and displayed to the client by the JSP 628.

Figure 7:
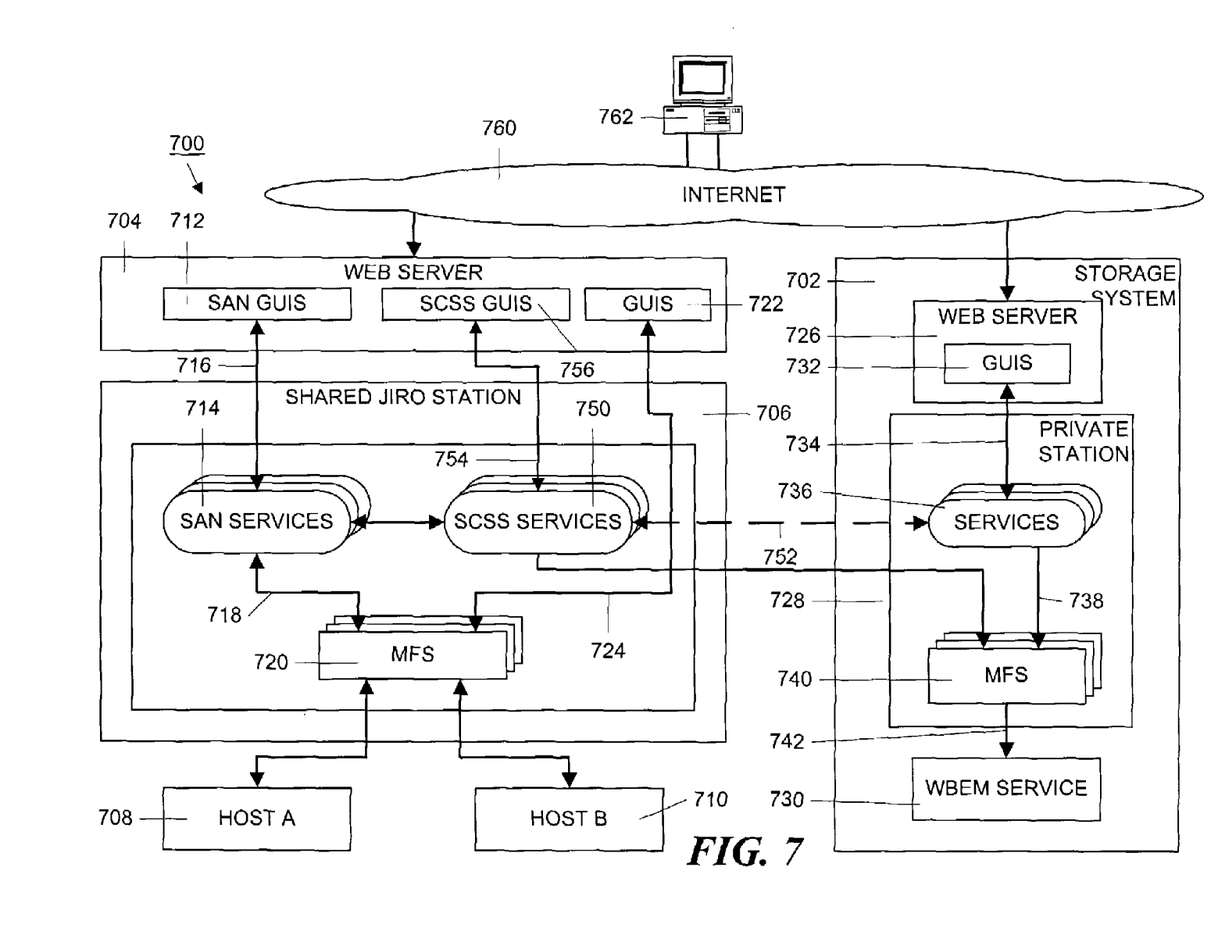
FIG. 7 is a block schematic diagram illustrating how the federated beans in the middle tier of the dedicated management system can be deployed in the shared Jiro™ station used to manage a SAN system in order to integrate the two management systems.

FIG. 7 illustrates how the management system in the self-contained storage system is integrated with the SAN management system. In FIG. 7, a SAN storage system 700 includes a self-contained storage system 702. The SAN management system 700 includes a web server 704 and a shared Jiro™ station 706. These correspond, respectively, to web server 240 and shared station 214 illustrated in FIG. 2. The web server 704 generates the SAN management GUIs 712 and 722 that, in turn, correspond to GUIs 250, 252 and 254 shown in FIG. 2.

The shared Jiro™ station 706 contains the SAN management services 714 that correspond to the services 230 and 232 shown in FIG. 2 and the other services described in connection therewith. GUIs 712 access these services as indicated by arrow 716 in the manner described above.

The SAN management services 714 interact with management facades 720 as indicated schematically be arrow 718. Management facades 720 correspond to management facades 216 and 218 and the interaction with the services is described above. In a similar manner, GUIs 722 interact with management facades 720 as indicated schematically by arrow 724 and as described above. Management facades, in turn, contact the appropriate CIM object managers in hosts 708 and 710 that correspond to hosts 206 and 210.

The self-contained storage system 702 includes a web server 726, a private Jiro™ station 728 and a WBEM service 730. These elements correspond to web server 520, private Jiro™ station 522 and WBEM service 524 shown in FIG. 5 and described above. The web server 726 generates GUIs that correspond to GUIs 526 and 528. These GUIs interact with services 736 in the private Jiro™ station 728 as indicated schematically by arrow 734. The services 736 correspond to services 530 in FIG. 5.

The services 736 interact with management facades 740 as indicated schematically by arrow 738. These management facades correspond to management facades 536 in FIG. 5. Finally, management facades 740 interact with CIM object managers in the WBEM service 730 as indicated schematically by arrow 742 and as described above with respect to FIG. 5 in order to configure and control elements in the storage system and to provide requested data services as described above.

In accordance with the principles of the invention, in order to integrate the self-contained storage system (SCSS) management system with the SAN management system, the federated Java beans that provide the services 736 and that are deployed in the private Jiro™ station 728 are also deployed in the shared Jiro™ station 706 that forms part of the SAN management system as indicated schematically by arrow 752. In the shared Jiro™ station 706, the beans provide services 750 that allow management personnel to manage the self-contained storage system.

In particular, the services 750 can be accessed and controlled by GUIs 756 generated by web server 704 as indicated schematically by arrow 754. This arrangement allows an administrator located at a remote terminal 762 to access the web server 704 via a network, such as Internet 760 and, via the GUIs 712, 722 and 756, to manage the entire system. In addition, where necessary, an administrator can access web server 726 from terminal 760, via Internet 762, in order to configure and control the individual elements that comprise the self-contained storage system 702 and to utilize the services 736 provided therein.

Figure 8A:
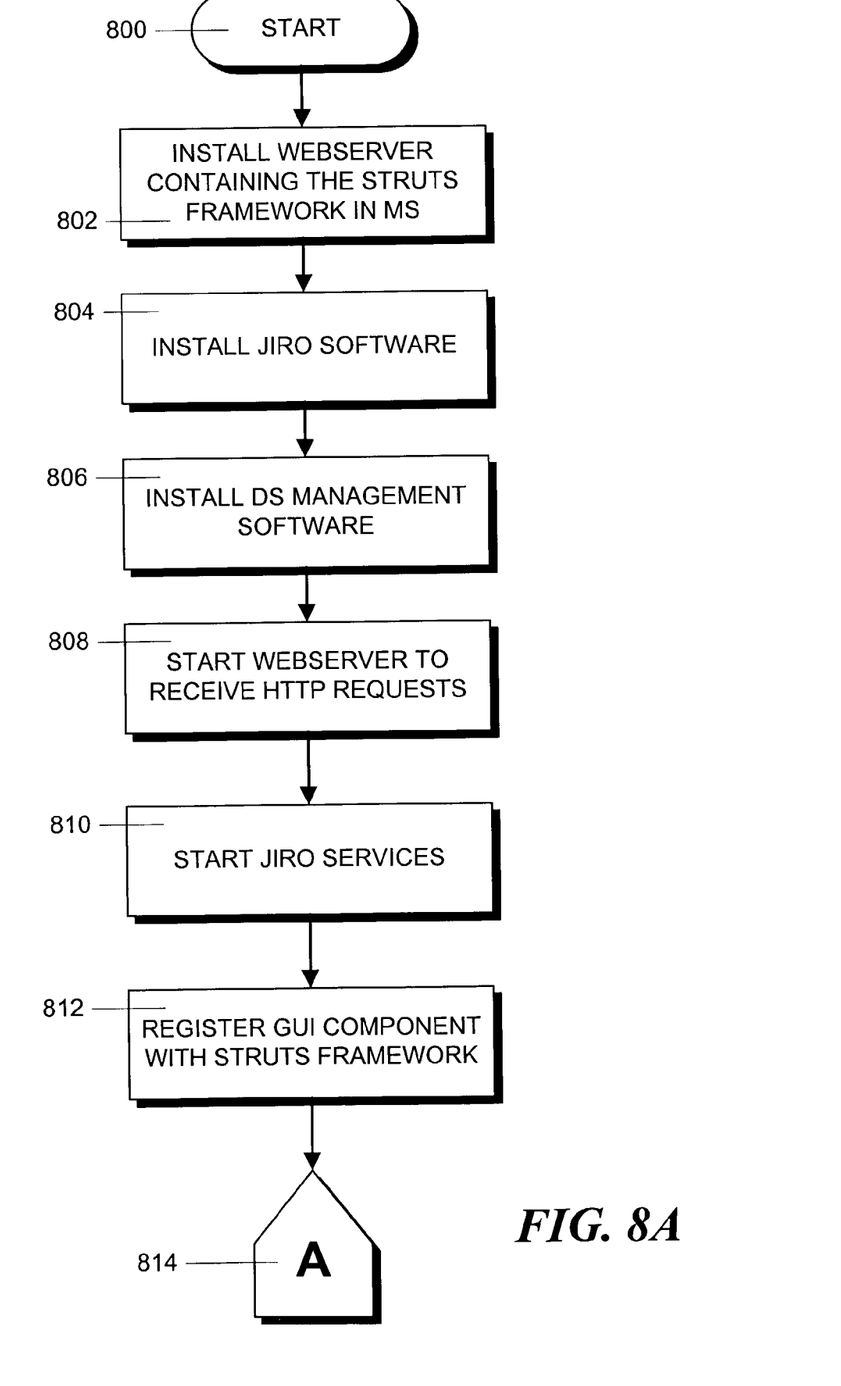
FIGS. 8A-8C, when placed together, form a flowchart that illustrates the steps in a process for installing management software on the SAN management system and on the self-contained storage system.
Figure 8B:
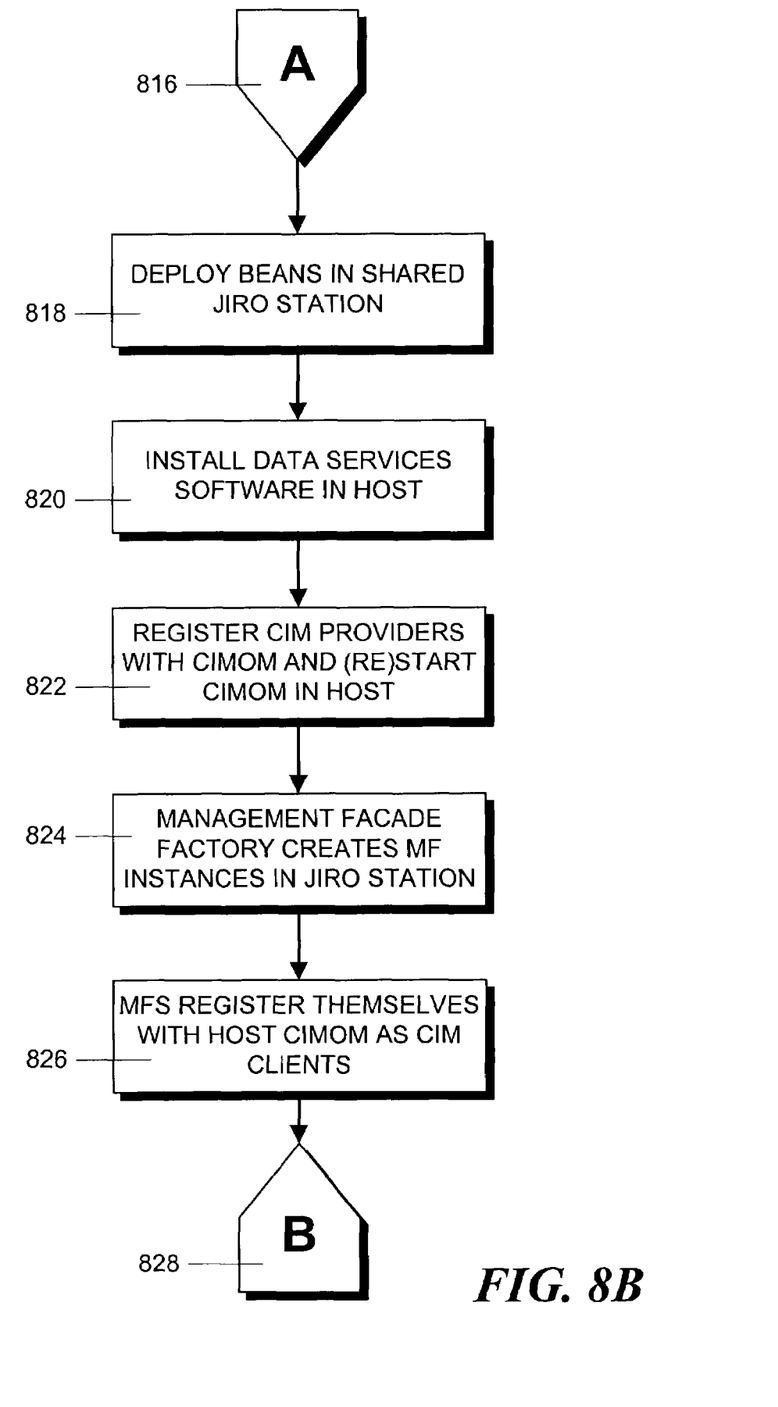
Figure 8C:
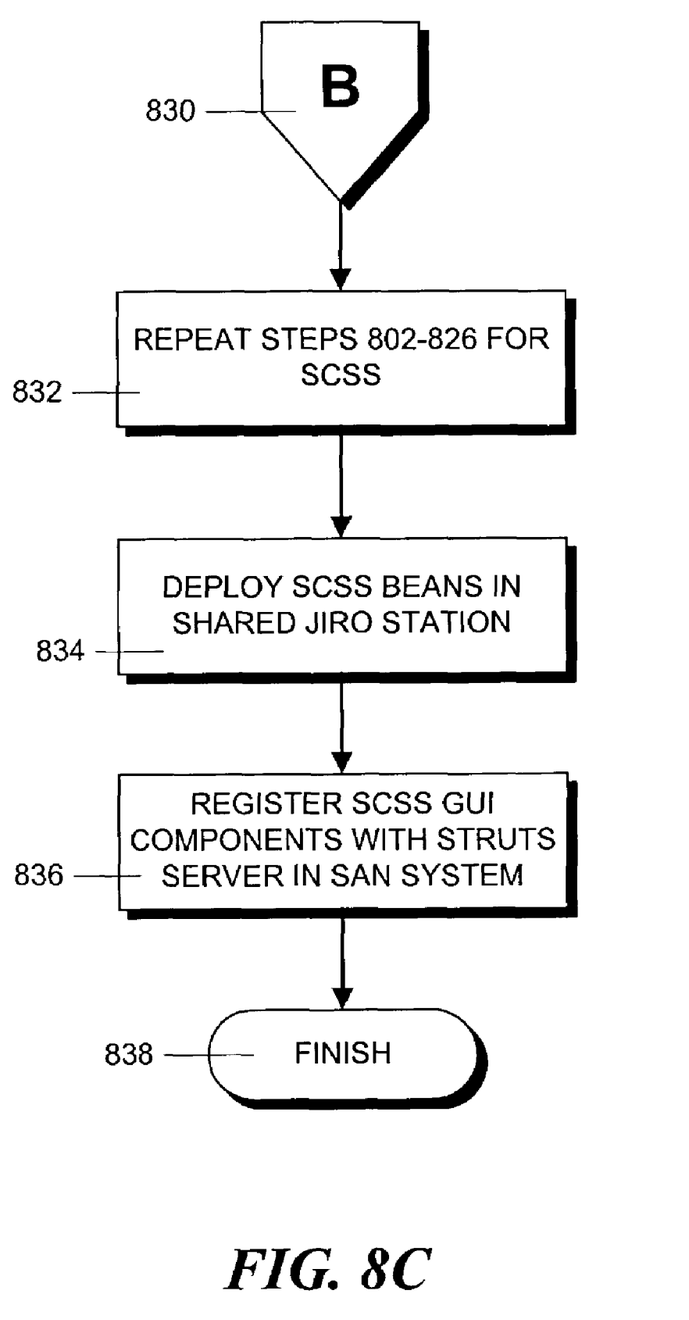

FIGS. 8A, 8B and 8C illustrate the steps performed in initially configuring the system. In particular, in order to use the inventive system, the software that is required must first be installed in the system, including the management server system 700, the host A system 708, the host B system 710 and the self-contained storage system 702. The steps of the installation process are shown in FIGS. 8A, 8B and 8C. The installation process begins in step 800 and proceeds to step 802 where a webserver 704 containing the STRUTS framework (if that framework is to be used to process the request) is installed in the management server 700 and, in step 804, the Jiro™ software is installed in the management server 700. The installation process for this software is explained in detail in the aforementioned Jiro SDK.

In step 806, the storage allocation, elements control and data service management software is installed in the management server system 700. This software includes the federated bean software 714.

In step 808, the webserver 704 is started so that it can receive http requests via the Internet 760 from a GUI component, such as a web browser, in terminal 762. In step 810, the Jiro™ services software is started and, in step 812, the GUI component in terminal 762 is registered with the STRUTS framework in the webserver 704.

The installation routine then proceeds, via off-page connectors 814 and 816, to step 818. In step 818, the federated beans are deployed in the shared Jiro station 706.

Next, the data services software used to provide data services is installed on both of the host systems 708 and 710 (this software is not shown in FIG. 7.) This software includes data service layer software similar to that shown in FIG. 4. In general, the CIM object manager instances installed in hosts 708 and 710 (not shown in FIG. 7) would be part of the operating system on the host and would not need to be separately installed. The managed object format files that are used to create the CIM providers would also have been previously installed.

In order to create instances of CIM providers (not shown in FIG. 7) in hosts 708 and 710, the MOF files must be registered with the respective CIMOMs. This is shown in step 822 where the MOF files are registered with the CIMOMs (not shown in FIG. 7) in the hosts 708 and 710 and the CIMOMs are restarted, if they are already running, or started, if they are not already running. When the CIMOMs are restarted, they create instances of the required CIM providers in accordance with the MOF files. During this process, appropriate creation events are generated by the CIMOMs.

In response to the creation events generated by the CIMOMs, a management facade factory (not shown in FIG. 7) creates instances of the corresponding management facades 720 in the shared Jiro™ station 706 as set forth in step 824.

Next, in step 826, the management facades register themselves with each host CIMOM as CIM clients. The process then proceeds, via off-page connectors 828 and 830 to step 832, in which the installation process of steps 802-826 is repeated for the self-contained storage system 702. When the latter process is complete, the self-contained storage system beans that are now deployed in the private Jiro™ station 728 in the storage system 702 are deployed in the shared Jiro™ station 706 in the SAN management system 700.

Next, in step 836, the GUI components for the self-contained storage system 702 are registered with the STRUTS component (if this is used to implement the web server) in the SAN web server 704. The installation is then complete in step 838.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing a storage area network comprising:
    (a) providing a plurality of host computers connected to a switch fabric;
    (b) providing a plurality of data storage devices connected to the switch fabric, the data storage devices in communication with the plurality of host computers by way of the switch fabric;
    (c) providing a self-contained storage system connected to the switch fabric as an additional storage device, the self-contained storage system being coupled to the plurality of data storage devices, the self-contained storage system in communication with the plurality of host computers by way of the switch fabric;
    (d) installing a first three-tier management system in a first computer system that is connected to the storage area network, the first three-tier management system having a presentation tier, a logic tier with a plurality of first service deployed in a shared station with the first computer system, and an agent tier;
    (e) installing a second three-tier management system in a second computer system that is within the self-contained storage system, the second three-tier management system having a presentation tier, a logic tier with a plurality of second services deployed in a private station within the second computer system, and an agent tier; and
    (f) deploying at least one of the second services from the second three-tier management system, of the self-contained storage system, in the shared station.

2. The method of claim 1 wherein the first management system comprises an administrative terminal and the presentation tier of the first three-tier management system comprises a first web server and wherein the method further comprises:
    (e) using the first web server to generate a graphic user interface in the administrative terminal; and
    (f) using the first web server to connect to the plurality of first services.

3. The method of claim 2 wherein the presentation tier of the second three-tier management system comprises a second web server and wherein the method further comprises:
    (g) using the second web server to generate a graphic user interface in the administrative terminal; and
    (h) using the second web server to connect to the plurality of second services.

4. The method of claim 3 further comprising connecting the administrative terminal to the presentation tier of the first three-tier management system and to the presentation tier of the second three-tier management system via the Internet.

5. The method of claim 1 wherein step (b) comprises deploying a first plurality of federated Java beans in the shared station in order to implement the plurality of first services.

6. The method of claim 5 wherein step (c) comprises deploying a second plurality of federated Java beans in the private station in order to implement the plurality of second services.

7. The method of claim 6 wherein step (d) comprises deploying at least one of the second plurality of federated Java beans in the shared station.

8. The method of claim 1 wherein the storage area network includes a plurality of hosts and the agent tier in the first three-tier management system comprises a plurality of CIM providers and wherein step (b) comprises installing CIM providers in each host in the storage area network.

9. The method of claim 8 wherein the storage area network includes a plurality of physical elements and wherein step (b) comprises installing CIM providers in the storage area network to configure and control each physical element.

10. The method of claim 1 wherein the agent tier in the second three-tier management system comprises a plurality of CIM providers and wherein step (c) comprises installing CIM providers in the second computer system.

11. The method of claim 10 wherein the second computer system comprises a plurality of physical elements and wherein step (c) comprises installing CIM providers in the second computer system to configure and control the physical elements.

12. Apparatus for managing a storage area network comprising:
    a plurality of host computers connected by a switch fabric;
    a plurality of data storage devices connected to the switch fabric, the data storage devices in communication with the plurality of host computers by way of the switch fabric;
    a self-contained storage system connected to the switch fabric as an additional storage device, the self-contained storage system being coupled to the plurality of data storage devices, the self-contained storage system in communication with the plurality of host computers by way of the switch fabric;
    a first three-tier management system installed in a first computer system that is connected to the storage area network, the first three-tiered management system having a presentation tier, a logic tier with a plurality of first services deployed in a shared station within the first computer system and an agent tier;
    a second three-tier management system installed in a second computer system that is within the self-contained storage system, the second three-tiered management system having a presentation tier, a logic tier with a plurality of second services deposed in a private station within the second computer system and an agent tier; and means for deploying at least one of the second services from the second three-tier management system, of the self-contained storage system, in the shared station.

13. The apparatus of claim 12 wherein the first management system comprises an administrative terminal and the presentation tier of the first three-tier management system comprises a first web server that generates a graphic user interface in the administrative terminal and connects to the plurality of first services.

14. The apparatus of claim 13 wherein the presentation tier of the second three-tier management system comprises a second web server that generates a graphic user interface in the administrative terminal and connects to the plurality of second services.

15. The apparatus of claim 14 further comprising means for connecting the administrative terminal to the presentation tier of the first three-tier management system and to the presentation tier of the second three-tier management system via the Internet.

16. The apparatus of claim 12 wherein the plurality of first services comprises a first plurality of federated Java beans deployed in the shared station.

17. The apparatus of claim 16 wherein the plurality of second services comprises a second plurality of federated Java beans deployed in the private station.

18. The apparatus of claim 17 wherein the means for deploying comprises means for deploying at least one of the second plurality of federated Java beans in the shared station.

19. The apparatus of claim 12 wherein the storage area network includes a plurality of hosts and the agent tier in the first three-tier management system comprises a plurality of CIM providers installed in each host in the storage area network.

20. The apparatus of claim 19 wherein the storage area network includes a plurality of physical elements and wherein the agent tier in the first three-tier management system further comprises CIM providers installed in the storage area network to configure and control each physical element.

21. The apparatus of claim 12 wherein the agent tier in the second three-tier management system comprises a plurality of CIM providers installed in the second computer system.

22. The apparatus of claim 21 wherein the second computer system comprises a plurality of physical elements and wherein the second three-tier management system comprises CIM providers installed in the second computer system to configure and control the physical elements.

23. A computer program product for managing a storage area network, comprising a computer usable storage medium having computer readable program code stored thereon, including:
    program code for providing a plurality of host computers connected to a switch fabric;
    program code for providing a plurality of data storage devices connected to the switch fabric, the data storage devices in communication with the plurality of host computers by way of the switch fabric.

24. The computer program product of claim 23 wherein the plurality of first services comprises federated Java bean program code for creating federated Java beans that are deposed in the shared station.

25. The computer program product of claim 24 wherein the plurality of second services comprises federated Java bean program code for creating federated Java beans that are deposed deployed in the private station.

26. The computer program product of claim 25 wherein the program code for deposing at least one of the second services in the shared station comprises program code for deploying at least one of the second plurality of federated Java beans in the shared station.

* * * * *

UNITED STATES PATENT AND TRADEMARK OFFICE
CERTIFICATE OF CORRECTION

PATENT NO. : 7,290,045 B2  
APPLICATION NO. : 10/186550  
DATED : October 30, 2007  
INVENTOR(S) : Chhandomay Mandal Page 1 of 1

It is certified that error appears in the above-identified patent and that said Letters Patent is hereby corrected as shown below:

In column 14, at line 65, delete "deposed" and insert --deployed--.

In column 16, at line 22, delete "." and insert --; program code for providing a self-contained storage system connected to the switch fabric as an additional storage device in the storage area network, the self-contained storage system being coupled to the plurality of data storage devices, the self-contained storage system in communication with the plurality of host computers by way of the switch fabric; program code for installing a first three-tier management system in a first computer system that is connected to the storage area network, the first three-tier management system having a presentation tier, a logic tier with a plurality of first services deployed in a shared station within the first computer system and an agent tier; program code for installing a second three-tier management system in a second computer system that is within the self-contained storage system, the second three-tier management system having a presentation tier, a logic tier with a plurality of second services deployed in a private station within the second computer system and an agent tier; and program code for deploying at least one of the second services from the second three-tier management system, of the self-contained storage system, in the shared station.--

In column 16, at line 32, delete "deposing" and insert --deploying--.

Signed and Sealed this

Fourth Day of March, 2008

JON W. DUDAS  
*Director of the United States Patent and Trademark Office*